Dec. 26, 1961  M. J. GREAVES  3,014,709
CRITICAL FLOW NOZZLE FOR PREVENTING PASSAGE
OF PULSATIONS IN A GAS STREAM
Filed June 22, 1959
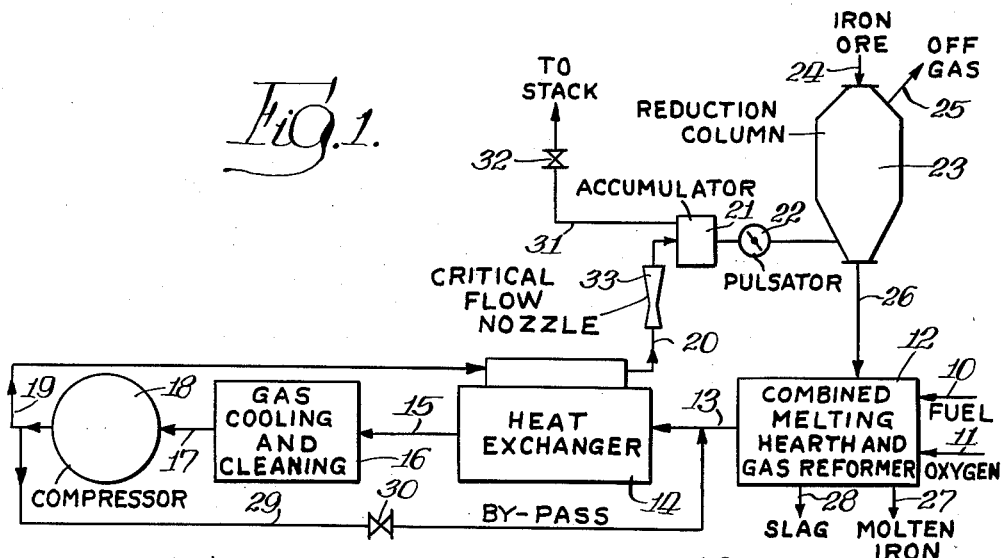
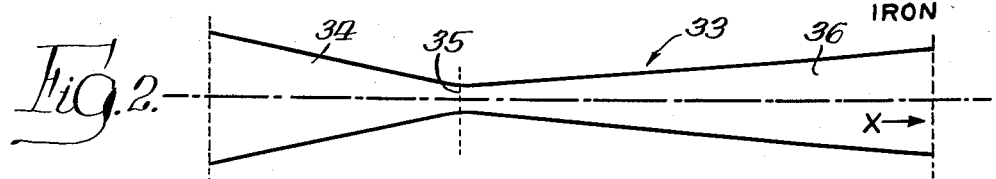
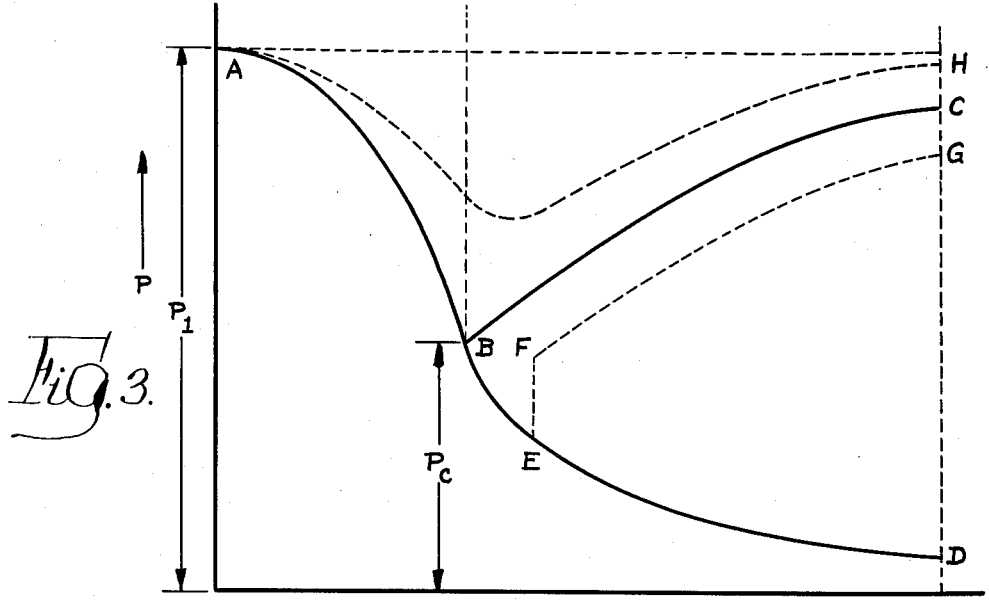
INVENTOR.
Melvin J. Greaves,
BY
Davis, Lindsey, Hibben & Noyes
Atty's.

3,014,709
CRITICAL FLOW NOZZLE FOR PREVENTING PASSAGE OF PULSATIONS IN A GAS STREAM

Melvin J. Greaves, Cleveland, Ohio, assignor, by mesne assignments, to Inland Steel Company, Chicago, Ill., a corporation of Delaware
Filed June 22, 1959, Ser. No. 822,122
9 Claims. (Cl. 266—13)

This invention relates to pulsation dampers and more particularly to a critical flow nozzle for isolating or preventing passage of pulsations in a gas stream.

In the production of metallic iron by countercurrent contact in a reduction column between an upwardly moving reducing gas and downwardly moving iron ore it has been found desirable to pulsate the flow of reducing gas prior to its introduction near the bottom of the column. The pulsating flow of reducing gas is advantageous for the reason, among others, that it is effective to minimize obstruction or mechanical impairments to the flow of iron ore, thereby providing a more uniform flow of the ore and better reduction. While it is thus advantageous to pulsate the flow of reducing gas to the reducing column, the pulsations may also travel upstream of the pulsation generator or source and cause damage or otherwise adversely affect some of the related components of the system along the flow path of the reducing gas, e.g. the compressor, heat exchanger, melting hearth, gas reformer, etc.

The present invention is thus directed, in its broadest aspects, to a gas flow system having a compressor, a pulsation generator downstream from the compressor, and novel means for preventing passage of pulsations in a direction upstream from the pulsation generator toward the compressor. More specifically, the invention contemplates a pulsation damper for an iron ore smelting system to prevent passage of the pulsations in a pulsated reducing gas to components of the system upstream of the pulsation generating source. As hereinafter described in detail, the pulsation damper is a critical flow nozzle which has the operating characteristic of being able to prevent passage of pulsations through the nozzle to points upstream of the flow therethrough when a critical flow is obtained through the nozzle throat. Thus, by locating the nozzle upstream of the pulsation generator and between the equipment to be protected and the pulsation generator, the pulsations will be confined to the reducing column and selected equipment between the nozzle and pulsation generator which will not be damaged by the pulsations.

Accordingly, it is a general object of the invention to provide an improved pulsation damper in a pulsating gas flow system.

A more specific object of the invention is to provide an improved means for preventing pressure pulsations, particularly pulsations having a relatively large amplitude and a relatively low frequency as compared to sound waves, from propagating upstream from a downstream pulsation generating source.

Another object of the invention is to provide a novel pulsation damper in the flow of a reducing gas to the reducing column of an iron ore smelting system so as to prevent passage of pulsations from a downstream pulsation generating source to components of the system located upstream of said source.

Other objects and advantages of the invention will be apparent from the subsequent description taken in conjunction with the accompanying drawing, in which:

FIG. 1 is a generally diagrammatic flow sheet illustrating some of the components in an iron ore smelting process with which the invention is applicable;

FIG. 2 is a diagrammatic view of one form of the critical flow nozzle used in the present invention; and FIG. 3 is a chart of the pressure variations along the nozzle of FIG. 2 to illustrate the operation thereof.

Although it is known to use a sonic nozzle at the intake of an air compressor for muffling the noise of the compressor, the present invention pertains to a quite different problem. Sound waves, such as those produced in a compressor, are pressure disturbances of relatively low amplitude (e.g. $3 \times 10^{-10}$ to $15 \times 10^{-6}$ p.s.i.) and relatively high frequency (e.g. 500 to 5000 c.p.s.). However, in a gas flow system with induced pressure pulsations, such as a reducing gas stream in an iron ore reduction system as hereinafter described, the pressure disturbances have a relatively greater amplitude (e.g. 1 to 10 p.s.i.) and a substantially lower frequency (e.g. ½ to 2 c.p.s.). To compensate for pressure pulsations of the latter type the present invention utilizes a critical flow nozzle which makes use of the principle that, once the directed kinetic energy of a gas stream is greater than the random kinetic energy, the molecules of gas cannot propagate their motion upstream. It is known from theoretical considerations that the maximum random motion is the velocity of sound and this, therefore, is the velocity necessary to isolate pressure disturbances. However, in accordance with the present invention, the use of a critical flow nozzle results in a high recovery of available energy whereas in a sonic nozzle used to dampen sound vibrations from a compressor or the like, the only concern is to dissipate the objectionable sound energy.

Although the invention will hereinafter be described in specific relation to an iron ore reduction system, it will be recognized that the principle of the invention has broader application as explained above.

Referring to FIG. 1, an iron ore smelting system is illustrated diagrammatically and comprises a preferred embodiment of the invention. Fuel, such as powdered coal, and oxygen are fed through lines 10 and 11 to a combined melting hearth and gas reformer 12. A reformed gas rich in CO and at a temperature of from about 1900° F. to about 2400° F. passes from zone 12 through a line 13 to the first stage of a heat exchanger 14 where it is cooled to a temperature of from about 500° F. to about 900° F. and then passes through a line 15 to a cooling and cleaning step 16 which may be, for example, a water scrubber. The cooled clean gas passes through an inlet 17 to a compressor 18 and is discharged through an outlet line 19 to the second stage of the heat exchanger 14 wherein the gas is reheated to a suitable reaction temperature, e.g. from about 900° F. to about 1800° F. The reducing gas then passes through a line 20 and a nozzle 33 (hereinafter described in detail) to an accumulator 21 and thence through a pulsation generator 22 to the lower end of a reduction column 23. Subdivided iron oxide ore is introduced by a line 24 into the upper end of the column 23 and passes in countercurrent contact with the upwardly flowing stream of reducing gas at a reaction temperature of from about 900° F. to about 1800° F. Spent reducing gas is removed at 25 and the reduced iron ore passes from the bottom of the column 23 through a line 26 to the hearth 12 where it is converted to molten iron and slag, the latter being withdrawn through lines 27 and 28. A by-pass line 29 with a valve 30 is provided between the compressor outlet 19 and the outlet 13 from the hearth-reformer 12 in order to permit recirculation of a controlled amount of gas and thereby obtain proper control of the gas temperature at the inlet to the first stage of the heat exchanger 14. A vent or bleeder line 31 with a valve 32 leading to an exhaust stack is also provided, in this instance at the accumulator 21, in order to control the pressure level of the gas in the system.

In countercurrent contacting of subdivided iron ore solids with a reducing gas under non-fluidized conditions, as in the column 23, difficulties are sometimes encountered with mechanical bridging or blocking which impedes the orderly flow of the ore solids. In order to combat this problem the pulsator 22 is provided downstream from the compressor 18 and preferably closely adjacent the column 23. The pulsator 22 may conveniently comprise a rotary disk or valve member which is adapted to be rotated for opening and partially closing the flow passage through the gas line at any desired frequency. This cyclic opening and closing of the valve, in conjunction with the accumulator 21 which provides a storage volume for the gas, imparts to the gas stream a pulsating effect as reflected by momentary increases and decreases in gas pressure and effectively avoids mechanical difficulties in the moving bed of solids in the column 23. The accumulator 21 may be unnecessary if the gas space or volume between the pulsator 22 and the outlet of the compressor 18 is large enough to provide the required capacitance in the system. The pulsations in the gas stream may have an amplitude of from about 1 p.s.i. to about 10 p.s.i. (usually from about 1 to about 3 p.s.i.) and a frequency of from about ½ to about 2 c.p.s.

It will be apparent however that, unless preventive measures are taken, pulsations in the gas stream will travel not only downstream from the pulsator 22 toward the column 23 but also upstream toward the compressor 18 and the hearth-reformer 12. This may be undesirable for a number of reasons. In the first place, the hearth-reformer 12 is designed to operate at a relatively low pressure of from about −0.1 p.s.i.g. to about +0.1 p.s.i.g. and it is essential that the pressure in the hearth zone and the reforming zone be controlled quite closely so that it does not vary more than about 0.05 p.s.i.g. Excessive pressure fluctuation in either the hearth or reforming zones causes undesirable intake of air and adversely affects the operation of the burners and the life of the refractories. In addition, it is also desirable for most efficient operation of the compressor that the pressure drop from the compressor discharge to the atmosphere at the exhaust stack be constant and not subject to fluctuations. Another disadvantage of upstream travel of pulsations from the pulsator 22 is that flow control and measurement instruments will also be adversely affected thereby complicating the operation of the process.

In order to prevent propagation of pulsations upstream from the pulsator 22 the present invention utilizes a critical flow nozzle 33 interposed in the line 20 between the accumulator 21 and the heat exchanger 14 so as to cancel out or prevent passage of the pulsations upstream of the accumulator. A critical flow nozzle is a device in which the flowing fluid reaches acoustic velocity in the throat. Since pressure waves are propagated in the gas at the speed of sound, a pressure wave originating downstream of the nozzle cannot pass through the throat to the upstream side when the nozzle is operating at critical flow.

Referring now to FIGS. 2 and 3, in conjunction with FIG. 1, it will be seen that the nozzle 33 is of the De Laval type and preferably includes a converging or inlet section 34, a throat 35, and a diverging or diffuser section 36. The pressures at the inlet, throat, and outlet of the nozzle are indicated at A, B, and C—D, respectively, in FIG. 3 which is a plot of the pressure variation along the length of the nozzle.

The theory of operation of a nozzle of the aforesaid type is based upon a characteristic of compressible fluid flow which is that when the Mach number (i.e. the ratio of the velocity of the fluid to the velocity of sound in the fluid for the particular conditions) is less than one, the velocity of the fluid will increase through the converging or inlet section 34 of the nozzle and will decrease through the diverging or diffuser section 36. When the Mach number is greater than one, the velocity of the fluid will decrease through the converging section 34 and will increase through the diffuser section 36. Because of this phenomenon, the velocity of the fluid in the throat 35 cannot exceed the velocity of sound. This factor is important in the design of a critical flow nozzle because it limits the range of flow rates within which the nozzle will successfully block pulsations for a particular set of flow conditions. The flow through the nozzle and the Mach number are thus primarily functions of the fluid pressure at the inlet A and at the outlet C—D.

Referring to FIG. 3 and assuming an inlet pressure $p_1$ greater than critical at the inlet A, the pressure in the nozzle will decrease and the velocity of the gas will increase toward the throat B until the flow velocity becomes critical or reaches the speed of sound for the particular gas. Since the velocity in the throat cannot exceed the velocity of sound, the pressure in the throat cannot fall below a certain critical pressure $p_c$. At this point, the gas may start to slow down on passing the throat and the pressure follows the upper curve B—C of FIG. 3 until it reaches the outlet C—D. Point C of FIG. 3 corresponds to an outlet pressure somewhat less than the inlet pressure and substantially greater than the critical pressure. The outlet pressure may however be substantially less than that necessary to provide a critical flow at the throat so that the velocity of the gas continues to increase in the diffuser section and becomes supersonic. This condition of supersonic velocity and subcritical pressure is indicated by the point D in FIG. 3.

As is more likely the case, the outlet pressure is at some value between points C and D, as for example the point G. Under these conditions the flow becomes supersonic on passing the throat until a compression shock occurs, this being indicated by the sudden vertical increase in pressure from E to F. After the shock, the flow continues at a subsonic velocity for the remainder of its passage through the diffuser and the pressure follows some such curve as FG to the outlet pressure. If the outlet pressure is at some point above C, such as H, critical flow will not be reached in the throat. However, as long as the outlet pressure remains below C, the nozzle throat pressure and the pressure at any point upstream from the throat will be unaffected. Moreover, at such conditions pulsations from the pulsator 22 traveling upstream toward the nozzle 33 at the speed of sound will not be able to pass the throat of the nozzle where the gas flow is also at sonic velocity.

Thus, by locating a critical flow nozzle 33 in the reducing gas feed conduit of an iron ore smelting system between the pulsator 22 and upstream components of the system which might be adversely affected by pulsations, the pulsations will be prevented from passing through the nozzle when a critical flow of reducing gas is maintained therethrough. This use of a critical flow nozzle differs materially from other known uses in that the nozzle is located downstream from the compressor rather than at the intake side, and the pulsations being damped are high amplitude-low frequency pulsations induced by the pulsator 22. The location of the nozzle 33 between the pulsator 22 and the discharge side of the compressor protects the compressor as well as the hearth-reformer and other associated equipment from the harmful effects of pressure fluctuations. Even more specifically, the location of the nozzle 33 between the pulsator 22 and the outlet from the heat exchanger 14 has the further advantage that the relatively high temperature gas is passed through the nozzle thus reducing fluid friction loss and eliminating possible difficulties from condensation. Moreover, in the specific system shown in FIG. 1 it is essential that the nozzle 33 be located at the downstream side of the compressor 18 beyond the by-pass line 29 in order to protect the hearth-reformer 12. Obviously, if the nozzle were at the intake side of the compressor, the pulsations could reach the hearth-reformer 12 through the by-pass line 29.

While only one embodiment of the invention has been herein illustrated and described, it will be understood that modifications and variations thereof may be effected without departing from the scope of the invention as set forth in the appended claims.

I claim:

1. In a gas flow system adapted to provide a pulsating flow of gas from a non-pulsating source including means at the downstream side of said source for pulsating said gas flow to impart pulsations of relatively large amplitude and relatively low frequency as compared with sound waves and structure upstream from said pulsating means in communication with said gas flow and tending to be adversely affected by said pulsations, protective means for said structure comprising a critical flow nozzle interposed between said pulsating means and said structure, said nozzle having converging, throat, and diverging portions constructed and arranged to provide sonic velocity of the gas flowing through the throat portion thereof whereby to prevent passage of said pulsations upstream from said nozzle to said structure.

2. In a gas flow system including a compressor and means at the downstream side of said compressor for generating pressure pulsations in the gas stream having a relatively large amplitude and a relatively low frequency as compared with sound waves, means for isolating the compressor from the pulsations comprising critical flow nozzle means interposed between said pulsation generating means and the discharge side of said compressor, said nozzle means being constructed and arranged to provide sonic velocity of the gas flowing therethrough whereby to prevent upstream passage of said pulsations through said nozzle means.

3. In a gas flow system for providing a pulsating flow of gas through a conduit from a non-pulsating source, the combination of means at the downstream side of the source for cyclically restricting and enlarging the gas flow passages in said conduit whereby to impart pulsations of relatively large amplitude and relatively low frequency as compared with sound waves, an accumulator between the source and said means and cooperable with the latter for causing pressure pulsations in the gas flow, and a critical flow nozzle interposed between the source and said accumulator, said nozzle being adapted to provide sonic velocity of the gas flowing therethrough whereby to prevent upstream passage of pulsations through the nozzle.

4. In a smelting system for the reduction of a metallic ore including a reduction vessel to which the ore and a reducing gas are fed, the combination of means providing a flow of reducing gas and having at least one portion thereof tending to be adversely affected by pulsations in the gas stream, pulsating means for imparting pressure pulsations to the reducing gas stream before it enters the reduction vessel, said pulsations having a relatively large amplitude and a relatively low frequency as compared with sound waves, and critical flow nozzle means interposed in the gas stream between said portion and said pulsating means, said nozzle means being constructed and arranged to provide flow at sonic velocity therethrough whereby to prevent upstream passage of said pulsations through said nozzle means and thereby protecting said portion.

5. In an iron ore reduction system including gas generator means for providing a reducing gas by combustion of fuel, operation of said gas generator means being adversely affected by pressure fluctuations therein, and a reduction vessel wherein iron ore is contacted with reducing gas supplied thereto from the generator means, the combination of means for pulsating the reducing gas supplied to the reduction vessel to impart pulsations of relatively large amplitude and relatively low frequency as compared with sound waves, and a critical flow nozzle interposed between said pulsating means and said gas generator means for protecting the latter against pulsations in the gas stream, said nozzle being constructed and arranged to provide sonic velocity in the gas flowing therethrough whereby to prevent upstream passage of pulsations from said pulsating means to said generator means.

6. In an iron ore reduction system including gas generator means for providing a reducing gas by combustion of fuel, a reduction vessel wherein iron ore is contacted with the reducing gas, and means including a compressor for passing said reducing gas from the gas generator means to the reduction vessel, operation of said gas generator means and said compressor being adversely affected by pressure fluctuations; the combination of means for pulsating the reducing gas supplied to the reduction vessel to impart pulsations of relatively large amplitude and relatively low frequency as compared with sound waves, and a critical flow nozzle interposed between said pulsating means and the compressor for protecting the compressor and the gas generator means against pulsations in the gas stream, said nozzle being constructed and arranged to provide sonic velocity in the gas flowing therethrough whereby to prevent upstream passage of pulsations from said pulsating means to the compressor and the gas generator means.

7. In an iron ore reduction system including gas generator means for providing a reducing gas by combustion of fuel, a reduction vessel wherein iron ore is contacted with reducing gas supplied thereto from the gas generator means, and temperature regulating means for regulating the temperature of the reducing gas at from about 900° F. to about 1800° F. before the gas is introduced into the reduction vessel; the combination of means interposed between the temperature regulating means and the reduction vessel for pulsating the reducing gas to impart pulsations of relatively large amplitude and relatively low frequency as compared with sound waves, and a critical flow nozzle interposed between said pulsating means and the temperature regulating means in downstream relation to the gas generator means for protecting the latter against pulsations in the gas stream, said nozzle being constructed and arranged to provide sonic velocity in the gas flowing therethrough whereby to prevent upstream passage of pulsations from said pulsating means to the gas generator means, and the high temperature of the gas entering said nozzle from said temperature regulating means serving to minimize fluid frictional losses and to eliminate condensation in the nozzle.

8. In an iron ore reduction system including gas generator means for providing a reducing gas by combustion of fuel, a reduction vessel wherein iron ore is contacted with the reducing gas, a compressor for passing the reducing gas from the gas generator means to the reduction vessel, and heating means for heating the gas discharged from the compressor; the combination of means interposed between the heating means and the reduction vessel for pulsating the reducing gas supplied to the reduction vessel to impart pulsations of relatively large amplitude and relatively low frequency as compared with sound waves, and a critical flow nozzle interposed between the heating means and said pulsating means in downstream relation to the compressor and the gas generator means, said nozzle having converging, throat, and diverging portions constructed and arranged to provide sonic velocity of the gas flowing through the throat portion thereof whereby to prevent passage of said pulsations upstream from said nozzle, and said heating means being effective to increase the temperature of the reducing gas so as to reduce fluid friction losses and eliminate condensation in the nozzle.

9. In an iron ore reduction system including gas generator means for providing a reducing gas by combustion of fuel, a reduction vessel wherein iron ore is contacted with the reducing gas, a compressor for passing the reducing gas from the gas generator means to the reduction vessel, heat exchange means between the gas generator means and the compressor for cooling the gas, and by-pass conduit means extending between the discharge side of the compressor and the inlet side of said heat exchange means for regulating the temperature of the gas entering the heat exchange means; the combination of means interposed between the compressor and the reduction vessel for pulsating the reducing gas supplied to the reduction vessel to impart pulsations of relatively large amplitude and relatively low frequency as compared with sound waves, and a critical flow nozzle interposed between said pulsating means and the juncture of the by-pass with the compressor discharge in downstream relation to the gas generator means, said nozzle being constructed and arranged to provide sonic velocity in the gas flowing therethrough whereby to prevent upstream passage of pulsations from said pulsating means to the gas generator means.

References Cited in the file of this patent

UNITED STATES PATENTS

| | | |
|---|---|---|
| 1,010,490 | Frick | Dec. 5, 1911 |
| 1,485,745 | Van Nuys | Mar. 4, 1924 |
| 1,578,682 | Raymond | Mar. 30, 1926 |
| 1,738,577 | Haven | Dec. 10, 1929 |
| 2,034,686 | Lattner | Mar. 17, 1936 |
| 2,229,119 | Nichols et al. | Jan. 21, 1941 |
| 2,386,292 | Carrier | Oct. 9, 1945 |
| 2,445,743 | McDonnell | July 20, 1948 |
| 2,822,257 | Hanna et al. | Feb. 4, 1958 |